United States Patent [19]

Schütze

[11] 4,283,924
[45] Aug. 18, 1981

[54] CLIMATIZING OF AIRCRAFT

[75] Inventor: Horst Schütze, Weyhe, Fed. Rep. of Germany

[73] Assignee: Vereinigte Flugtechnische Werke-Fokker GmbH, Bremem, Fed. Rep. of Germany

[21] Appl. No.: 63,075

[22] Filed: Aug. 2, 1979

[30] Foreign Application Priority Data

Aug. 4, 1978 [DE] Fed. Rep. of Germany ....... 2834256

[51] Int. Cl.³ .............................................. F25D 9/00
[52] U.S. Cl. .......................................... 62/402; 62/89; 62/172; 62/201; 62/430
[58] Field of Search ................... 62/89, 172, 402, 430, 62/201

[56] References Cited

U.S. PATENT DOCUMENTS

| | | | |
|---|---|---|---|
| 3,177,679 | 4/1965 | Quick et al. | 62/172 |
| 4,014,179 | 3/1977 | Iles et al. | 62/172 |
| 4,015,438 | 5/1977 | Kinsell et al. | 62/172 |

Primary Examiner—Ronald C. Capossela
Attorney, Agent, or Firm—Smyth, Pavitt, Siegemund & Martella

[57] ABSTRACT

An aircraft cabin is climatized by tapping air from the engine compressors and feeding it into the cabin through a loop which includes a compressor, a cooling turbine driving the compressor, and several cooling stages. A second loop, using preferably helium, includes a second compressor and a second turbine, the second compressor being driven by both turbines, and the cooled helium is in heat exchange with another cooling loop which runs through instrument compartments. Discharged cabin air is used to precool the compressed helium.

6 Claims, 1 Drawing Figure

U.S. Patent      Aug. 18, 1981      4,283,924
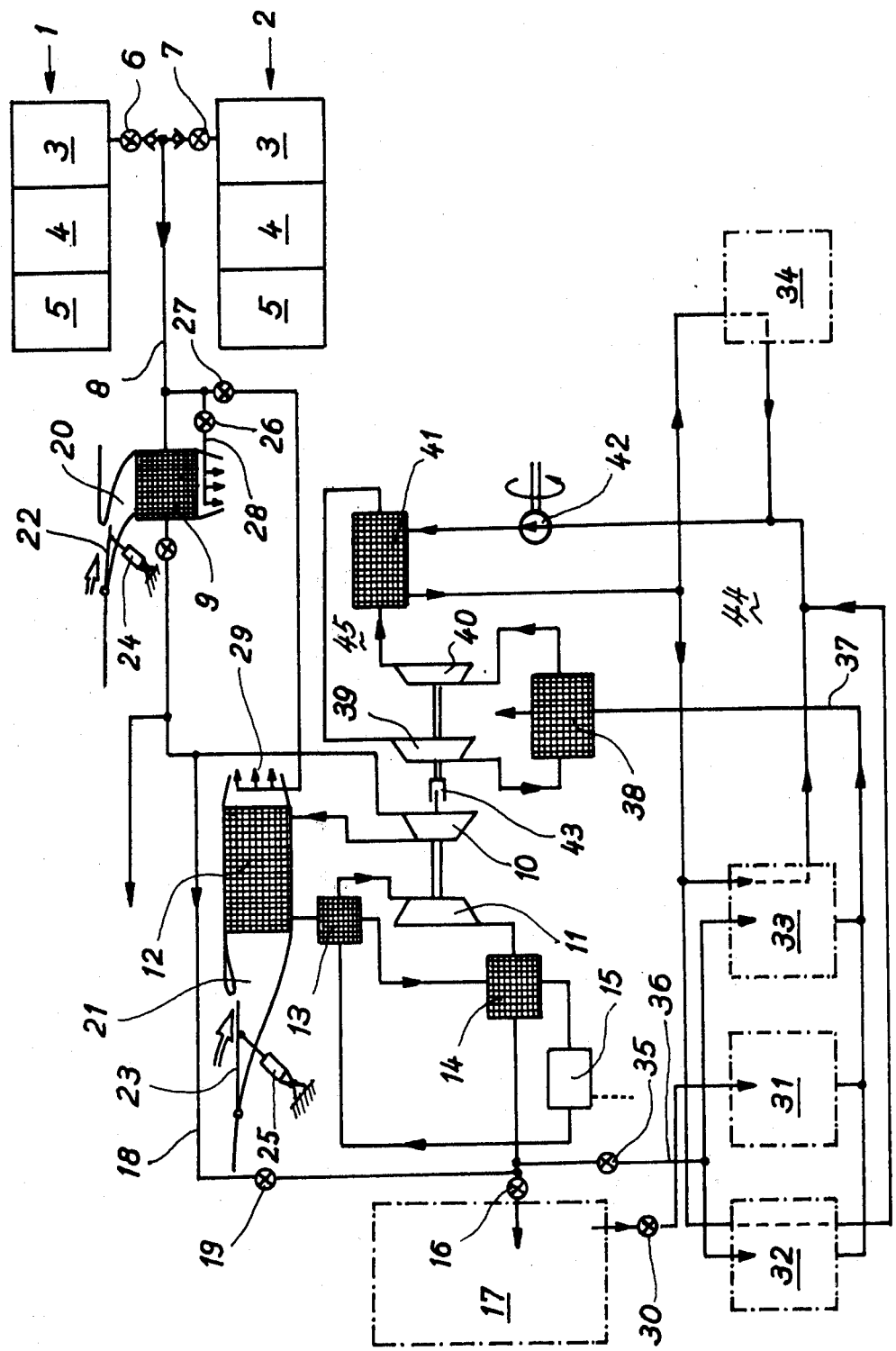

CLIMATIZING OF AIRCRAFT

BACKGROUND OF THE INVENTION

The present invention relates to climate control, i.e., air conditioning cooling and heating of the cabin of an aircraft.

The temperature of the air in an aircraft cabin is usually controlled by means of pressurized air taken (i.e., tapped) from a compressor stage in one of the engines, unless a separate compressor is provided for that purpose. One should tap the engine compressor only if, thereby, the power of the engine is not, or only very insignificantly, reduced. Military aircraft have a comparatively small cabin so that the air requirements for climate control can, indeed, be satisfied from an engine compressor without loss in power. However, military aircraft are to an increasing extent "loaded" with sensitive electronic equipment which must also be climatized. Safety of the aircraft as well as completion of the assigned mission depends on the proper working of this equipment. Thus, inspite of a small crew cabin, one does also need a large amount of air for climate control of a military aircraft, and interference with the power requirement of propulsion may be expected if an engine were to be tapped.

The situation is different for commercial, i.e., passenger, aircraft, but with a similar result. A modern passenger plane has a *large* passenger cabin and requires considerable quantities of air on that account alone. It can thus be seen that the practice of tapping the engine compressor for climatizing the plane appears to be no longer an attractive approach.

DESCRIPTION OF THE INVENTION

It is an object of the present invention to improve aircraft climatizing and air conditioning systems which still use air tapped from at least one engine compressor as a principle, or even as an exclusive power source, as well as the source for the air to be conditioned.

From a somewhat different point of view, it is an object of the present invention to climatize and air conditioning interior compartments of an aircraft under utilization of a minimum amount of tapped engine compressor air, using more effeciently the enthalpy of that air to reduce interference with engine power.

It is, therefore, a specific object of the present invention to improve aircraft air conditioning systems which include a precooler for tapped engine compressor air, a compressor, heat exchange means, and water precipitator, and a cooling and expansion turbine driving the compressor and feeding cool air, e.g., into the passenger cabin of the aircraft.

It is a specific, though more general, object of the present invention to improve the air conditioning and climatizing system for an aircraft, which system includes a turbine for expanding and cooling tapped aircraft engine compressor air and feeding the cooled air into the passenger or crew compartment of the aircraft.

In accordance with the preferred embodiment of the present invention, it is suggested to improve particularly systems as of one of the specific objects by causing the turbine to drive a compressor which is inserted in a closed loop for a cooling fluid (air, helium, or a mixture thereof; at least some helium being preferred), and includes the primary circuit and the secondary circuit, respectively, of two heat exchangers, as well as another turbine for the cooling fluid as it flows from the secondary circuit of one exchanger to the primary circuit of the other one. The primary circuit of the one heat exchanger receives discharged cabin air, and the secondary circuit of the other heat exchanger cools a closed loop cooling circuit which, in turn, cools aircraft compartments, additionally or exclusively. Preferably, the second turbine drives also the compressor of the closed loop. The invention, thus, permits the supplemental, or even exclusive, cooling of particular compartments, e.g., those containing sensitive instrumentation.

The preferred embodiment of the invention, the objects and features of the invention, and further objects, features and advantages thereof will be better understood from the following description taken in connection with the accompanying drawings.

DESCRIPTION OF THE DRAWINGS

The FIGURE illustrates a block diagram of a climate control system for aircraft in accordance with the preferred embodiment of the present invention.

Proceeding now to the detailed description of the drawings, the FIGURE shows somewhat schematically two aircraft engines, 1 and 2, each being comprised of a high, compression stage 3, an intermediate compression stage 4, and a low compression stage 5. The high compression stages 3 are both tapped by means of valves 6 and 7, feeding jointly a conduit 8, which leads to a precooling stage 9 before this air is fed to an auxiliary compressor 10.

Compressor 10 is driven by a turbine 11, whose function it is to cool the air before discharging it into aircraft cabin 17. The compressed air outputted by compressor 10 is passed through the primary circuit of a heat exchanger 12, for extracting therefrom thermal energy under utilization of ram pressure extracted from the outside of the aircraft.

The flow path of tapped and compressed air is continued as follows. Upon discharge from heat exchanger 12, the air passes through the primary circuit of a heat exchanger cooler 13, through the primary circuit of a regenerative heat exchanger 14, through a water and moisture separator 15, and back again, but through the secondary circuit of cooler 13 to the input of decompressing and cooling turbine 11, driving compressor 10.

The decompressed air, as discharged from turbine 11, passes through the secondary circuit of heat exchanger 14 and a valve 16 into passenger cabin 17, being climatized thereby. In order to adjust the air temperature, hot air is tapped from the input side of compressor 10 via a conduit 18 and a valve 19. Thus, hot air, if permitted to flow, is added to the cold air ahead, i.e., upstream of valve 16, to carefully balance the temperature of the air for the passenger compartment.

As was stated above, precooling stage 9 and heat exchanger 12 are independently charged with ram pressure via intake ducts 20 and 21, respectively; and these ducts can be closed or opened by means of flaps 22 and 23. The reference numerals 24 and 25 refer to control devices (piston-cylinder arrangements) to open and close these flaps in a manner known per se. Precooling can, thus, be regulated in a careful manner.

Whenever the craft is on the ground, ram pressure is not available. However, reference numerals 28 and 29 refer to injection-type nozzles on the discharge side of the secondary circuit of the two devices 9 and 12, to such air through these devices. The injectors 28 and 29 are under control of nozzles 26 and 27, leading to a common tap on duct 8. This, of course, requires that at least one engine is running and that duct 8 is, indeed, pressurized.

As far as the cabin air discharge is concerned, a valve 30 controls the flow from suitable ducts and intakes at the cabin; valve 30 controls the feeding of the air into a room or compartment 31. Reference numerals 32 and 33 denote other such compartments and spaces, all of which are also to be climatized; they contain various kinds of instruments, electronic devices, etc. Compartments 32 and 33, in particular, are climatized by fresh air tapped ahead of valve 16 via a duct 36 and a valve 35.

The air circulation is maintained and continued through a return manifold 37, feeding the discharged air for cooling (primary circuit) through a heat exchanger 38, which, in turn, discharges into the outer atmosphere. The secondary circuit of this heat exchanger 38 is part of a closed loop 45 which includes another compressor 39 and another cooling and expansion turbine 40, driving compressor 39. The cooled and expanded air is passed through the primary circuit of another heat exchanger 41, back into compressor 39. This particular loop, therefore, includes two additional heat exchangers; the secondary circuit of one (exchanger 38) is interposed between output and input of, respectively, 39 and 40, and the primary circuit of the other (exchanger 41) between output and input of 40 and 39.

The secondary circuit of heat exchanger 41 is passed through by a coolant, flowing through a loop 44 which has three parallel branches running through compartments 32 and 33 as well as another compartment 34. A pump 42 maintains the flow of this collant in loop 44. The various flow paths of and through compartments 31 to 34 domonstrate the versatility of the system.

As stated indirectly, compressor 10 and turbine 11 are mounted on a common shaft so that the latter drives the former, and compressor 39 and turbine 40 are also mounted on a common shaft for a similar purpose. In addition, a clutch or controllable coupling 43 is provided to interconnect these two shafts. Since turbine 11 develops more power than needed in compressor 10, this turbine can participate in driving compressor 39. In fact, this supplemental power is needed as closed loop 45 is unable to sustain itself. The working fluid in this loop 45 can also be air; but since it is a closed loop, one may use a more suitable medium such as helium or a mixture of coolants, such as air and helium.

The fluid of the closed loop is compressed in compressor 39 and heated thereby, precooled in heat exchanger 38 and decompressed in expansion turbine 40 under further reduction in temperature. This, in turn, permits heat exchanger 41 to cool the coolant in loop 44 to the requisite temperature; this is the principle purpose of loop 45.

The function of the cooling and working fluid in loop 45 is especially enhanced by the use of helium due to a particular property of helium; its temperature drops more than in the case of air when being decompressed in turbine 40. That, of course, produces a more intensive cooling of the liquid in loop 44 by means of heat exchanger 41.

The air conditioning (in a broader sense) of compartments 31, 32, and 33 by means of cabin air, or air tapped from the cabin feed line, has the advantage that the temperature in these compartments can well be matched to specific requirements.

Another advantage of the inventive system is the efficient use of energy and power. This is particularly true with regard to the additional use one can make of primary auxiliary turbine 11 to maintain the second air conditioning loop (45) and for maintaining supplemental cooling of these other compartments. Further advantages result from the precooling of the fluid in auxiliary loop 45 by means of air discharged from the passenger cabin through heat exchanger 38. The overall system is, thus, very much suited for climatizing the passenger cabin as well as the compartments containing sensitive instruments and electronic equipment.

The above invention is not limited to the embodiments described above, but all changes and modifications thereof not constituting departures from the spirit and scope of the invention are intended to be included.

I claim:

1. In a system for climatizing and air conditioning interior compartments of an aircraft, including the passenger cabin, under utilization of air tapped from a compressor of an engine of the aircraft, the system including a cooling turbine for driving a compressor for the tapped air, the turbine cooling this tapped air as compressed by the compressor prior to discharge into the passenger cabin, the improvement comprising:

a second compressor connected to be driven by said first turbine and having an input and discharge output;

a closed cooling loop which includes (i) said second compressor, (ii) a second turbine for cooling and compressing fluid in the closed loop, (iii) a first heat exchanger connected between the discharge output of the second compressor for compressed fluid and an input for the second turbine for passing thereto fluid cooled by the first heat exchanger, and (iv) a second heat exchanger connected between a discharge output of the second turbine after expanding work and said input of the second compressor;

means for feeding air discharged from the cabin to the first heat exchanger, for precooling the fluid as it flows from the second compressor to the second turbine; and a second loop for cooling other compartments and being connected for being cooled by the second heat exchanger and by the fluid as it flows through the second heat exchanger from the second turbine to the second compressor.

2. In a system as in claim 1, said second turbine also driving said second compressor.

3. The improvement as in claim 1 or 2, wherein the fluid in the first loop is helium.

4. The improvement as in claim 1 or 2, wherein the fluid in the first loop is air.

5. The improvement as in claim 1 or 2, wherein the fluid is a helium air mixture.

6. The improvement as in claim 2, said first turbine and compressor being on a first common shaft, said second turbine and compressor being on a second common shaft, and clutch means for interconnecting the first and second shafts.

* * * * *